US011321477B2

(12) United States Patent
Katsoulakos et al.

(10) Patent No.: US 11,321,477 B2
(45) Date of Patent: May 3, 2022

(54) GEOGRAPHICALLY CO-DEPENDENT DOCUMENT CONTAINERS

(71) Applicant: Inlecom Group BVBA, Brussels (BE)

(72) Inventors: Panayotis Katsoulakos, Campello (ES); Gerasimos Kouloumpis, Ntrafi-Pikermi (GR); Patrick J. O'Sullivan, Dublin (IE); Ioanna Fergadiotou, Athens (GR); Konstantinos Loupos, Athens (GR); Antonios Mygiakis, Chalandri (GR)

(73) Assignee: INLECOM GROUP BVBA, Brussels (BE)

( * ) Notice: Subject to any disclaimer, the term of this patent is extended or adjusted under 35 U.S.C. 154(b) by 70 days.

(21) Appl. No.: 16/894,414

(22) Filed: Jun. 5, 2020

(65) Prior Publication Data

US 2021/0383003 A1    Dec. 9, 2021

(51) Int. Cl.
*G06F 21/62* (2013.01)
*H04L 29/06* (2006.01)
*G06F 21/60* (2013.01)
*G06F 16/93* (2019.01)

(52) U.S. Cl.
CPC .......... *G06F 21/6209* (2013.01); *G06F 16/93* (2019.01); *G06F 21/602* (2013.01); *H04L 63/107* (2013.01)

(58) Field of Classification Search
CPC .... G06F 21/6209; G06F 21/602; G06F 16/93; H04L 63/107
See application file for complete search history.

(56) References Cited

U.S. PATENT DOCUMENTS

| | | | |
|---|---|---|---|
| 8,892,872 B2 | 11/2014 | Davis | |
| 10,387,669 B1* | 8/2019 | Lim | ...................... G06F 21/604 |
| 2003/0182435 A1* | 9/2003 | Redlich | ............ C07K 14/70575 |
| | | | 709/229 |
| 2007/0086593 A1* | 4/2007 | Denning | ............... H04L 9/0872 |
| | | | 380/286 |
| 2008/0313527 A1 | 12/2008 | Chen | |
| 2013/0040657 A1* | 2/2013 | Jackson | .................. G06F 21/84 |
| | | | 455/456.1 |
| 2014/0006347 A1 | 1/2014 | Qureshi et al. | |

(Continued)

*Primary Examiner* — Vance M Little
(74) *Attorney, Agent, or Firm* — CRGO Global; Steven M. Greenberg

(57) ABSTRACT

Embodiments of the present invention provide a method, system and computer program product for co-dependent document container management. Co-dependent document container management includes loading into memory of a computer, a document container encapsulating a document, a co-dependency rule assigning a dependency of access to the document upon a specific geographic location, and co-dependency document access program code. The program code of the container may be executed in the memory of the computer causing the retrieval of a geographic position of the computer, the application of the co-dependency rule to the retrieved geographic position and, on condition that the geographic position of the computer satisfies the co-dependency rule, the location of a document viewer registered in the computer to render the document and the direction of the computer to launch the document viewer with the document as input to the document viewer.

14 Claims, 2 Drawing Sheets

(56) References Cited

U.S. PATENT DOCUMENTS

2014/0245015 A1\* 8/2014 Velamoor ............... G06F 21/10
　　　　　　　　　　　　　　　　　　713/171
2016/0182529 A1\* 6/2016 Biehl ..................... H04W 4/02
　　　　　　　　　　　　　　　　　　726/1

\* cited by examiner

GEOGRAPHICALLY CO-DEPENDENT DOCUMENT CONTAINERS

BACKGROUND OF THE INVENTION

Field of the Invention

The present invention relates to the field of document sharing and digital rights management and more particularly to secure document transmission.

Description of the Related Art

The era of computing, above all else, has revolutionized the manner in which documents are created and shared. Documents now may be created digitally, repeatedly edited to perfection and then shared from across the globe instantaneously without requiring the reduction of the document to paper form at any time. Of course, the convenience of digital document creation comes at a price. In the world of printed documentation, absent a forgery, an original document can be recognized on its face and the recipient of the document, mostly assured by the creator of the document. But, in the world of the digital document, once the digital document has changed hands, there is no telling how the document might continue to change hands, how many duplicates may be made of the document and what modifications are applied to the document.

To address the foregoing challenges, digital rights management (DRM) provides a technology enabled to limit access to a digital document, to prevent the unauthorized redistribution of a digital document, and to restrict the ways in which a recipient of a digital document can copy the content therein. Typically, DRM is implemented by embedding program code in the subject document that prevents the copying of the document, specifies a time period in which the document can be accessed, and limits a number of devices upon which the document may be viewed. Generally, DRM is associated with a specific type of document—digital media. However, DRM also has been applied to smart contracting.

DRM has proven to be an effective tool in the management of the distribution of digital media, however, DRM generally presumes the independent nature of the document subject to DRM. But, in some instances, a document is dependent upon a physical object such that the document is integral to the physical object, and more so, the physical object is tied to the document. Examples include a shipping manifest, a material safety data sheet, a bill of lading, a certificate of authenticity and the like. Likewise, in some instances, a document is dependent upon a physical location such that the document is integral to the physical location. Examples include an event admissions ticket, a voucher redeemable at a specific location, or an internal memorandum deemed sensitive and not permitted to be removed from a specific location.

BRIEF SUMMARY OF THE INVENTION

Embodiments of the present invention address deficiencies of the art in respect to the management of a co-dependent document and provide a novel and non-obvious method, system and computer program product for co-dependent document container management.

In an embodiment of the invention, a method for co-dependent document container management includes loading into memory of a computer, a document container encapsulating a document, a co-dependency rule assigning a dependency of access to the document upon a specific geographic location and a person or role associated with the specific geographic location, and co-dependency document access program code. The method additionally includes executing the program code of the container in the memory of the computer. The program code during execution, retrieves a geographic position of the computer and an identity of an individual seeking access to the document, and applies the co-dependency rule to the retrieved geographic position and the identity of the individual. On condition that the geographic position of the computer and the identity of the individual satisfy the co-dependency rule, the program code locates a document viewer registered in the computer to render the document and directs the computer to launch the document viewer with the document as input to the document viewer. But otherwise, on condition that the geographic position of the computer and the identity of the individual fail to satisfy the co-dependency rule, the program code denies access to the document.

In one aspect of the embodiment, the document is encrypted while encapsulated in the container and the program code, on condition that the geographic position of the computer satisfies the co-dependency rule, decrypts the document before directing the computer to launch the document viewer. For instance, the program code decrypts the document with a key based upon the geographic position. In another aspect of the embodiment, the program code, on condition that the geographic position of the computer fails to satisfy the co-dependency rule, obfuscates the document while the document remains encapsulated in the container.

In yet another aspect of the embodiment, the co-dependency rule specifies a maximum distance between the geographic position of the computer and a geographic position of a specified object. As well, in yet another aspect of the embodiment, the co-dependency rule additionally specifies a time frame during which the computer with the container in the memory is within the maximum distance of the geographic position of the specified object. As even yet another aspect of the embodiment, the document may be a raster image of underlying text, and the document viewer may be a raster image viewer encapsulated by the container and installed by the program code onto the computer during the execution of the program code. In this aspect of the embodiment, the document viewer permits only an affixation of a digital form of a signature onto the document and the persistence of the document with the signature back into the container.

In another embodiment of the invention, a data processing system is adapted for co-dependent document container management. The system includes a host computing platform of one or more computers, each with memory and at least one processor. The system also includes a co-dependency document access program module encapsulated within a document container that also encapsulates a document and a co-dependency rule that assigns a dependency of access to the document upon a specific geographic location and a person or role associated with the specific geographic location. The program module includes computer program instructions enabled while executing in the host computing platform to retrieve a geographic position of the host computing platform and an identity of an individual seeking to access to the document, apply the co-dependency rule to the retrieved geographic position and the identity of the individual and, on condition that the geographic position of the host computing platform and the identity of the individual satisfy the co-dependency rule, locates a document viewer registered in the computer to render the document and directs the computer to launch the document viewer with the document as input to the document viewer. But, otherwise on condition that the geographic position of the computer and the identity of the individual fail to satisfy the co-dependency rule, the program code denies access to the document.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for co-dependent document container management. In accordance with an embodiment of the invention, co-dependent document container management includes the encapsulation of a document within a digital container. The digital container includes a co-dependency rule linking access to the document with a location of the document, either in terms of an absolute location, a characterized location type, or a location within proximity of a specific object or type of object. The digital container, upon receipt, executes program code in a computing device during an access attempt from the computing device, the program code being operable to geolocate the computing device and to apply the co-dependency rule to the geolocation of the computing device. In the event that the computing device is determined to be located within an area specified by the co-dependency rule to permit access to the encapsulated document, the program code may then locate a suitable document viewer and launch the viewer with a reference to the encapsulated document. Otherwise, the program code may deny access to the document.

Figure 1:
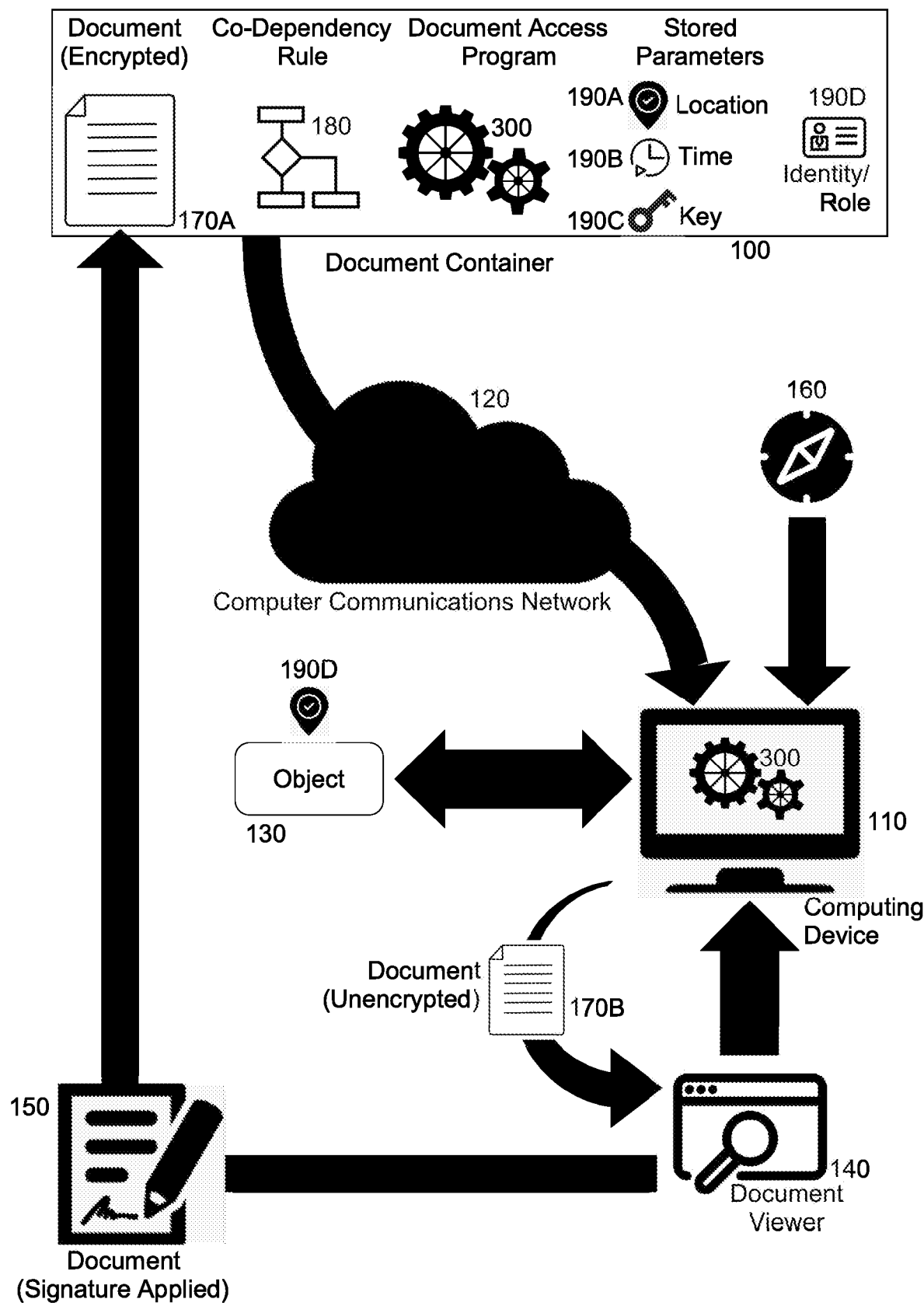
FIG. 1 is a pictorial illustration of a process for co-dependent document container management.

In further illustration, FIG. 1 is a pictorial illustration of a process for co-dependent document container management. As shown in FIG. 1, a document container 100 is a digital file that encapsulates each of a document 170A, a co-dependency rule 180 and a document access program 300, and is transmitted over a computer communications network 120 and stored in a computing device 110. The co-dependency rule 180 specifies a dependency relationship between a location 160 determined for the computing device 110 and the document 170A, such as an absolute location or relative location, or an object 130 with a location 190D. As an option, the document container 100 encapsulates stored parameters including a pre-specified geographic location 190A to be compared by the document access program 300 with the location 160 of the computing device 110, and a specified time or time frame 190B to be compared by the document access program 300 with a contemporaneous time determined in the computing device 110. Optionally, the document 170A is encrypted according to an encryption key 190C.

In operation, the document container 100 once stored in the computing device 110 may be activated with a request to open the document container 100. Upon receiving the request, the document access program 300 executes in the memory of the computing device 110. In the course of the execution of the document access program 300, the program 300 retrieves a location 160 of the computing device 110 and provides the location 160 to the co-dependency rule 180. The co-dependency rule 180 compares the location 160 to a pre-specified location 190A so as to determine if the attempt to access the document 170A has occurred within a threshold distance of the pre-specified location 190A. Alternatively, the co-dependency rule 180 compares the location 160 to a location 190D of an associated object 130 such as a shipping container, or a truck, or rail car, in order to determine if the attempt to access the document 170A has occurred within a threshold distance of the object 130.

Optionally, the co-dependency rule 180 additionally compares a contemporaneously retrieved time and date to a stored time frame 190B in order to determine if the attempt to access the document 170A has occurred before a lapse of a time indicated by the time frame 190B. As yet a further option, the co-dependency rule 180 additionally compares a contemporaneously identified individual providing the request to open the document container 100 with an identity/role 190D to determine if the individual is expressly permitted to access the document 170A at the pre-specified location 190A, or if the individual has a role that is expressly permitted to access the document 170A at the pre-specified location 190A.

Once the co-dependency rule 180 has been applied to the location 160, and the document access program 300 in turn having determined in consequence that the computing device 110 is positioned proximately to either the stored location 190A or the location 190D of the object 130, and optionally at a time within the time frame 190B, the document access program 300 locates a document viewer 140 stored within the computing device 110 that has been associated with a type of the document 170A. Optionally, to the extent that the document 170A has been encrypted, the document access program 300 applies the key 190C to decrypt the document 170A to produce decrypted document 170B. Thereafter, the document access program 300 directs the document viewer 140 to display the document 170B.

In one optional aspect of the embodiment of the invention, the document viewer 140 is stored in the document container 100 itself. The document viewer 140 in this instance is enabled to perform only the rendering of the document 170B, the application of a signature to the document 140 through a user interface of the document 140 and the storage of the document 150 with the signature applied in the document container. In this way, a specific geographic location of the document 170A can be assured, whether an absolute location 160 or a location 190D relative to a known object 130, before the document access program 300 permits access to the document 170A without requiring that the document container 100 maintain any communicative linkage with any remote program logic and without requiring the computing device 110 to be pre-configured with program logic enabled to control access to the document 170A. Rather, as described herein the function of document access is self-contained within the container 100 along with the document 170A itself. Yet, the condition upon which the document 170A may be accessed is variable depending upon the nature of the co-dependency rule 180 provided therewith.

Figure 2:
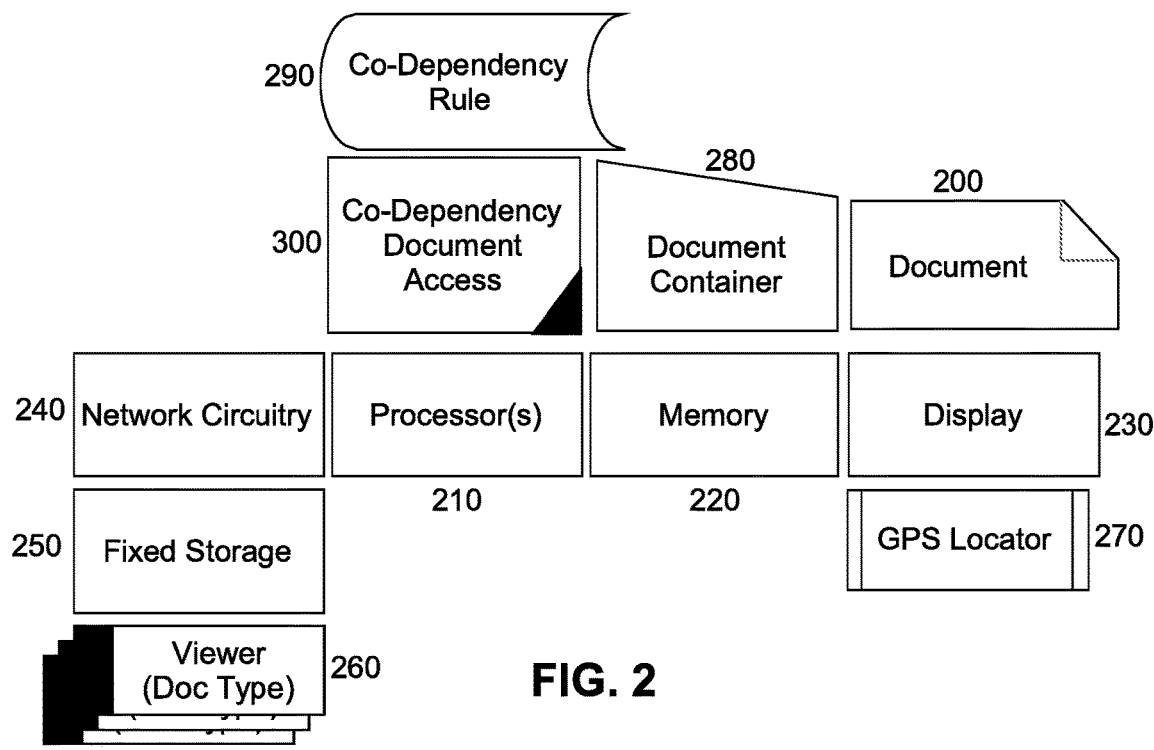
FIG. 2 is a schematic illustration of a document data processing system configured for co-dependent document container management; and, FIG. 3 is a flow chart illustrating a process for co-dependent document container management.

The process described in connection with FIG. 1 may be implemented in a document data processing system. In further illustration, FIG. 2 schematically shows a document data processing system configured for co-dependent document container management. The system includes a host computing platform that includes one or more processors 210, memory 220, a display 230, network circuitry 240 adapted to transmit and receive data from over a computer communications network and fixed storage 250 storing therein different document viewers 260, each corresponding to a different document type. The host computing platform also includes a global positioning system (GPS) locator 270 configured to determine a contemporaneous location of the host computing platform on demand. Of note, a document container 280 received through the network circuitry 240 is stored in the memory 220 of the host computing platform. The document container 280 encapsulates a document 200 along with a co-dependency rule 290 and a co-dependency document access module 300.

The co-dependency document access module 300 includes computer program instructions that when executed by the one or more processors 210 while in the memory 220 of the host computing platform, is enabled to retrieve a location from the GPS locator 270 and to apply the co-dependency rule 290 to the retrieved location in order to determine whether or not the host computing platform in which the program instructions execute is positioned with a threshold distance from a pre-specified location or a location determined for an associated object such as a shipping container, truck or rail car. Optionally, in lieu of a GPS locator 270, the location may be retrieved in reference to a known location of a gateway utilized by the network circuitry 240 in routing network requests to remotely positioned computing processes over the computer communications network. As a further option, the location may be estimated from an Internet protocol (IP) address assigned to the network circuitry 240. In the latter instance, it may first be determined whether or not the IP address purportedly assigned to the network circuitry 240 is known to belong to a range of IP addresses commonly associated with the deployment of a virtual private network (VPN). Then, only if the IP address of the network circuitry 240 is determined not to implicate the use of a VPN can the IP address be correlated through a lookup operation over the computer communications network to a table associating IP address with corresponding geographic locations.

The program instructions are further enabled during execution by the one or more processors 210 to select one of the viewers 260 for the type of the document 200 on the condition that the retrieved location is determined according to the co-dependency rule 290 to be within a threshold distance of the pre-specified location or the location of an associated object. Otherwise, the program instructions are enabled to deny access to the document 200. In this way, access to the document can be restricted to a moment in time when the document is viewed only within proximity of a specific place such as within the boundaries of the workplace or a specific room in the workplace, and optionally only within a specific time frame.

Figure 3:
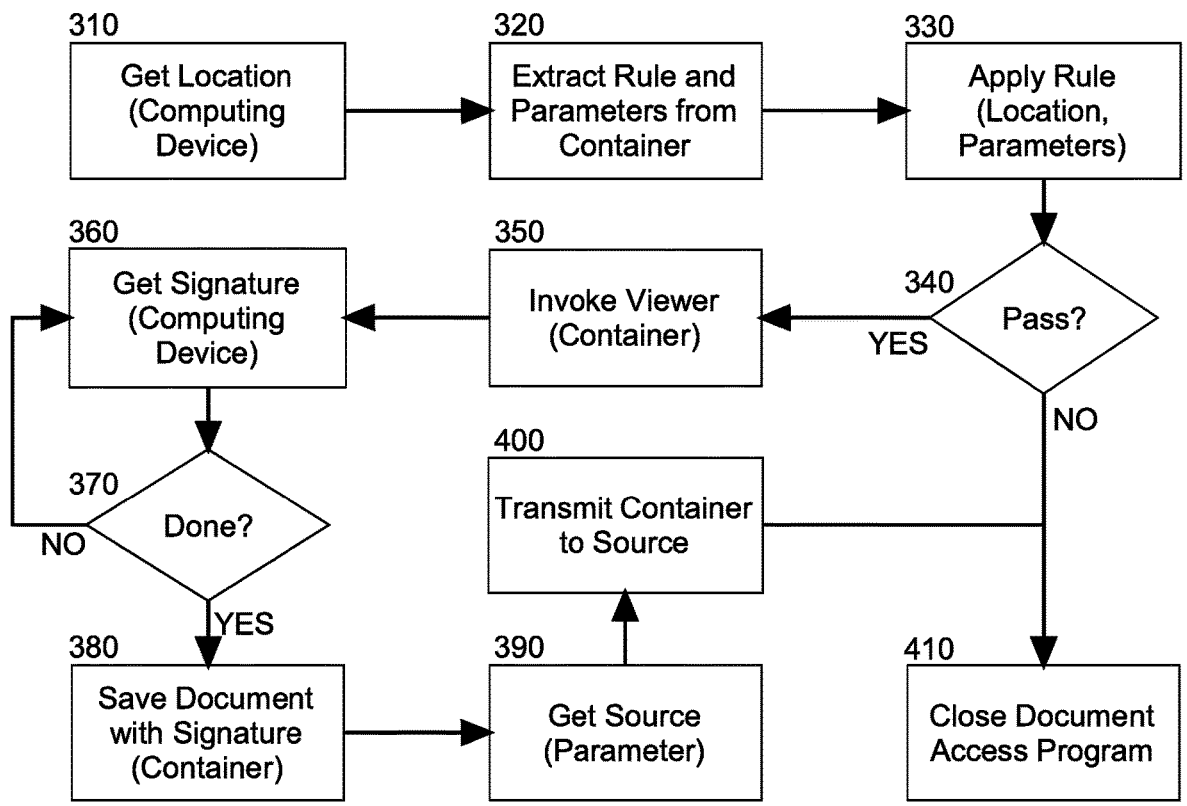

In even yet further illustration of the operation of the co-dependency document access module 300, FIG. 3 is a flow chart illustrating a process for co-dependent document container management. Beginning in block 310, a location of the computing device is determined upon execution of the co-dependency document access module 300 in the document container. Then, in block 320 a co-dependency rule and corresponding pre-stored parameters are extracted from the container. The pre-stored parameters may include a network address of a source of the container from whom the container had been received from over a computer communications network, along with a pre-specified location or a pre-specified object having a corresponding location. In block 330, the co-dependency rule is applied to the retrieved location in respect to the extracted parameters.

In decision block 340, on the condition that the retrieved location is determined to be within a threshold distance of a location specified in the stored parameters, in block 350 a document viewer stored in the container that is associated with a type of the document in the container is invoked and in block 360, a signature is received through the viewer. In decision block 370 if the signature has been affixed to the document, in block 380 the document is saved with the affixed signature in the container. Thereafter, a source of the transmission of the container is determined from the stored parameters of the container and in block 400 the container is then transmitted to the source. Finally, in block 410 the document access program is closed. In this way, it can be assured that the signature is affixed to the document while the document is viewed in geographic proximity to a specific location, or while the document is viewed in geographic proximity to a specific object.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network. The computer readable program instructions may execute entirely on the user's computer, partly on the user's computer, as a stand-alone software package, partly on the user's computer and partly on a remote computer or entirely on the remote computer or server. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "include", "includes", and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for co-dependent document container management comprising:
    loading into memory of a computer, a document container encapsulating a document, a co-dependency rule assigning a dependency of access to the document upon a specific geographic location and a person or role associated with the specific geographic location, and co-dependency document access program code; and,
    executing the program code of the container in the memory of the computer, the program code during execution retrieving a geographic position of the computer and an identity of an individual seeking access to the document, applying the co-dependency rule to the retrieved geographic position and the identity of the individual and, on condition that the geographic position of the computer and the identity of the individual satisfy the co-dependency rule, locating a document viewer registered in the computer to render the document and directing the computer to launch the document viewer with the document as input to the document viewer, but otherwise, on condition that the geographic position of the computer and the identity of the individual fail to satisfy the co-dependency rule, denying access to the document;
    wherein the co-dependency rule specifies a maximum distance between the geographic position of the computer and a geographic position of a specified object;
    wherein the document is a raster image of underlying text, and wherein the document viewer is a raster image viewer encapsulated by the container and installed by the program code onto the computer during the execution of the program code, the document viewer permitting only an affixation of a digital form of a signature onto the document and the persistence of the document with the signature back into the container.

2. The method of claim 1, wherein the document is encrypted while encapsulated in the container and the program code, on condition that the geographic position of the computer satisfies the co-dependency rule, decrypts the document before directing the computer to launch the document viewer.

3. The method of claim 2, wherein the program code decrypts the document with a key based upon the geographic position.

4. The method of claim 1, wherein the program code, on condition that the geographic position of the computer fails to satisfy the co-dependency rule, obfuscates the document while the document remains encapsulated in the container.

5. The method of claim 1, wherein the co-dependency rule additionally specifies a time frame during which the computer with the container in the memory is within the maximum distance of the geographic position of the specified object.

6. A data processing system adapted for co-dependent document container management, the system comprising:

a host computing platform comprising one or more computers, each comprising memory and at least one processor; and, a co-dependency document access program module encapsulated within a document container also encapsulating a document and a co-dependency rule assigning a dependency of access to the document upon a specific geographic location and a person or role associated with the specific geographic location, the program module comprising computer program instructions enabled while executing in the host computing platform to perform:

retrieving a geographic position of the host computing platform and an identity of an individual seeking access to the document;

applying the co-dependency rule to the retrieved geographic position and the identity of the individual; and, on condition that the geographic position of the host computing platform and the identity of the individual satisfy the co-dependency rule, locating a document viewer registered in the computer to render the document, and directing the computer to launch the document viewer with the document as input to the document viewer, but otherwise, on condition that the geographic position of the computer and the identity of the individual fail to satisfy the co-dependency rule, denying access to the document;

wherein the co-dependency rule specifies a maximum distance between the geographic position of the computer and a geographic position of a specified object;

wherein the document is a raster image of underlying text, and wherein the document viewer is a raster image viewer encapsulated by the container and installed by the program code onto the computer during the execution of the program code, the document viewer permitting only an affixation of a digital form of a signature onto the document and the persistence of the document with the signature back into the container.

7. The system of claim 6, wherein the document is encrypted while encapsulated in the container and the program instructions, on condition that the geographic position of the computer satisfies the co-dependency rule, decrypts the document with a key based upon the geographic position before directing the computer to launch the document viewer.

8. The system of claim 6, wherein the program instructions, on condition that the geographic position of the host computing platform fails to satisfy the co-dependency rule, obfuscates the document while the document remains encapsulated in the container.

9. The system of claim 6, wherein the co-dependency rule additionally specifies a time frame during which the host computing platform with the container in the memory is within the maximum distance of the geographic position of the specified object.

10. A computer program product for co-dependent document container management, the computer program product including a non-transitory computer readable storage medium having program instructions embodied therewith, the program instructions executable by a device to cause the device to perform a method including:

loading into memory of a computer, a document container encapsulating a document, a co-dependency rule assigning a dependency of access to the document upon a specific geographic location and a person or role associated with the specific geographic location, and co-dependency document access program code; and, executing the program code of the container in the memory of the computer, the program code during execution retrieving a geographic position of the computer and an identity of an individual seeking access to the document, applying the co-dependency rule to the retrieved geographic position and the identity of the individual and, on condition that the geographic position of the computer and the identity of the individual seeking access to the document satisfy the co-dependency rule, locating a document viewer registered in the computer to render the document and directing the computer to launch the document viewer with the document as input to the document viewer, but otherwise, on condition that the geographic position of the computer and the identity of the individual fail to satisfy the co-dependency rule, denying access to the document;

wherein the co-dependency rule specifies a maximum distance between the geographic position of the computer and a geographic position of a specified object;

wherein the document is a raster image of underlying text, and wherein the document viewer is a raster image viewer encapsulated by the container and installed by the program code onto the computer during the execution of the program code, the document viewer permitting only an affixation of a digital form of a signature onto the document and the persistence of the document with the signature back into the container.

11. The computer program product of claim 10, wherein the document is encrypted while encapsulated in the container and the program code, on condition that the geographic position of the computer satisfies the co-dependency rule, decrypts the document before directing the computer to launch the document viewer.

12. The computer program product of claim 11, wherein the program code decrypts the document with a key based upon the geographic position.

13. The computer program product of claim 10, wherein the program code, on condition that the geographic position of the computer fails to satisfy the co-dependency rule, obfuscates the document while the document remains encapsulated in the container.

14. The computer program product of claim 10, wherein the co-dependency rule additionally specifies a time frame during which the computer with the container in the memory is within the maximum distance of the geographic position of the specified object.

* * * * *